United States Patent [19]

Ohtake et al.

[11] Patent Number: 6,048,561
[45] Date of Patent: Apr. 11, 2000

[54] COFFEE PUFF SNACK AND METHOD OF MANUFACTURING THE SAME

[75] Inventors: Hiroyuki Ohtake; Masayoshi Kinoshita, both of Tokyo, Japan

[73] Assignee: Unicafe Inc., Tokyo, Japan

[21] Appl. No.: 09/134,968

[22] Filed: Aug. 17, 1998

[30] Foreign Application Priority Data

Aug. 21, 1997 [JP] Japan ..................... 9-260769
May 20, 1998 [JP] Japan ..................... 10-137853

[51] Int. Cl.$^7$ ........................................ A23L 1/18
[52] U.S. Cl. .................. 426/559; 426/94; 426/445; 426/450; 426/549; 426/598; 426/621
[58] Field of Search ................... 426/94, 549, 445, 426/450, 619, 620, 621, 559, 598

[56] References Cited

U.S. PATENT DOCUMENTS

| | | | |
|---|---|---|---|
| 4,965,081 | 10/1990 | Lazarus | 426/445 |
| 5,326,583 | 7/1994 | Taga et al. | 426/621 |
| 5,382,443 | 1/1995 | Kincaid et al. | 428/621 |

*Primary Examiner*—Lien Tran
*Attorney, Agent, or Firm*—Dilworth & Barrese

[57] ABSTRACT

A coffee puff snack and a method of manufacturing the same, which, are provided, in which the snack does not lack characteristic coffee flavor that is uniformly spread over its surface and inside, and also can be shaped directly in a single working process. The coffee puff snack is a product which is manufactured through a process of feeding mixed materials of roasted comminuted coffee bean grains, other grains, and moisture added when necessary, into an extruder, pressurizing and heating for gelatinization, puffing, shaping, and drying.

17 Claims, No Drawings

COFFEE PUFF SNACK AND METHOD OF MANUFACTURING THE SAME

BACKGROUND OF THE INVENTION

1. Field of the Invention

The present invention relates generally to puff snacks, which provide crunchy light taste by puffing grains, and to a method of manufacturing the same, and more particularly to a puff snack that contains coffee beans as raw material and to a method of manufacturing the same.

2. Description of the Related Art

Puff snacks, which have crunchy light taste, are products manufactured from grain, such as corn, wheat is or rice, through a process of pressurizing and heating in an extruder for gelatinization (or alphanization), and then puffing, shaping and drying.

It has been impossible, however, to obtain a crunchy light puff snack by using coffee beans, one kind of grain to be raw material, in order to make a puff snack which has the characteristic coffee flavor, because coffee beans would not puff, if fed into an extruder, pressurized and heated like grain as rice, wheat or corn.

For that reason, the single method to obtain puff snacks with characteristic coffee flavor has been to add coffee flavor indirectly to crunchy light taste by coating puffed and shaped material grains, such as rice, wheat or corn, with coffee powder or flavoring liquid.

However, the process, which intended to obtain a coffee puff snack by previously shaping a puff snack of other grain and later coating it with coffee powder or flavoring liquid has been complicated, because with this process, coffee flavor is added only over the surface of the snack and the flavor does not become uniform inside and outside of it, and besides, it is impossible to shape the snack with coffee flavor directly in one process.

Moreover, a crunchy light snack with characteristic coffee flavor hitherto known acquires desired crunchy taste by being baked to form layers inside of coffee beans. Though this snack has coffee flavor, it is too bitter to eat without adding any other flavoring liquid over it, such as chocolate, because this snack is just made from carbonized coffee beans. Therefore, it is not worth naming this snack a puff snack with characteristic coffee flavor.

SUMMARY OF THE INVENTION

The present invention attempts to solve these problems. It is therefore the object of the present invention to provide a coffee puff snack and a method of manufacturing the same, which snack, does not lack characteristic coffee flavor that is uniformly spread over the surface and inside of the snack, and also, can be shaped directly in a single manufacturing process.

In the present invention, coffee beans, which can not puff by nature, are comminuted into coffee bean grains, and combined with other grains that can be puffed alone to puff together. This process enables coffee beans to mix with other grains more easily and to be a puffed product by gelatinization with the other grains. This may be because the other grains contain an adequate amount of moisture, protein, and starch for facilitating the puffing so that coffee beans themselves can puff with the help of those grains.

The present invention therefore provides a product which is manufactured through a process of mixing roasted, comminuted coffee bean grains with other grains and of puffing. More particularly, the present invention provides a product which is manufactured through a process of feeding mixed materials of roasted, comminuted coffee bean grains, other grains, and moisture added if necessary into an extruder, pressurizing and heating them for gelatinization, and then puffing, shaping, and drying.

It would also be suitable for a puffed product manufactured with this process to be coated with desired flavors, for example, sugar, honey, candy, caramel, chocolate, or milk.

In the present invention, the preferred rate of coffee bean grains mixed with other grains capable of being puffed is below 60% of the whole raw material. It is because if the rate of coffee bean grains is over 60% of the whole raw material, the bitterness of coffee remains too strong to eat. However, attention should be paid that the characteristic coffee flavor would be spoiled when the rate of coffee bean grains is too small.

In the present invention, moisture in raw material should be modulated to be 10 to 20% of the whole material, and about 15% is more preferable, though the preferred rate of moisture may be variable depending on the kind of grain mixed with coffee beans. That is, too small amount of moisture results in a hard product difficult to eat, whereas too large amount of moisture leads to too a soft product difficult to shape. Moreover, needless to say, additional moisture is unnecessary, when raw material already contains about 15% of moisture, or also, when the rate of moisture is modulated to be about 15% of the whole material by soaking coffee beans or other grain in water beforehand.

In the present invention, the roughness size of coffee bean grains is preferably 20 to 30 mesh, and the size of other grains is preferably 12 to 20 mesh. It is because too large grains may remain instead of being gelatinized, and too small grains may prevent smooth moving in an extruder. However, the roughness size of grains such as coffee bean grains, does not always have to be in the above range, and there is no problem as long as the majority of grains is in the above range, though some of them are out of it.

DESCRIPTION OF THE PREFERRED EMBODIMENT

An embodiment of the present invention will now be described.

In the invention, coffee bean grains roasted at L-28, about 75% of which is 20 to 30 mesh in size, are mixed with corn grains (Corn Grits M2-Y: Honen Corporation), about 85% of which is 12 to 20 mesh in size. Then, after adding water to make the amount of moisture in the whole material about 15%, the material is fed into an extruder (a single-shaft type puff machine: manufactured by Saito Technical Project, Co., Ltd.). Then, the material is pressurized and heated for gelatinization with the number of revolution of the extruder set at 200 to 250 rpm, puffed, shaped, and dried into a coffee puff snack. At that time, the rate of the coffee bean grains was variously changed. Table 1 below shows the results.

TABLE 1

| RATE OF COFFEE BEANS | SHAPE | COLOR | AROMA | TASTE |
|---|---|---|---|---|
| 62.5% | poor | coffee bean | strong | too bitter to eat |
| 50.0% | slightly poor | coffee bean | strong | fairly bitter |
| 37.5% | slightly | light | moderate | bitter |

TABLE 1-continued

| RATE OF COFFEE BEANS | SHAPE | COLOR | AROMA | TASTE |
|---|---|---|---|---|
|  | good | coffee bean |  |  |
| 25.0% | good | light coffee bean | moderate | slightly bitter |
| 12.5% | good | light brown | weak | not much bitter |

The results shown in Table 1 above reveals that a coffee puff snack that contains over 60% of coffee beans is inferior both in its appearance, such as shape and color, and in its aroma and taste, and therefore the rate of coffee beans should be below 60%, and preferably, below about 37.5% as a product.

According to the present invention as described hereinbefore, it is possible to obtain a puff snack made from coffee beans, which has never been manufactured before, and to enjoy a brand new flavor, which cannot be achieved with other kinds of grain, such as corn.

Moreover a coffee puff snack of this invention can realize not only the characteristic coffee flavor of a puff snack and also its uniformity both outside and inside of the snack by mixing coffee bean grains and other grains thoroughly.

Besides a coffee puff snack of the invention can be manufactured efficiently, because it can be shaped directly in a single production process.

Furthermore, a coffee puff snack of the invention can be enjoyed with various kinds of flavors by applying desired flavors, such as sugar, honey, candy, caramel, chocolate, or milk therearound if necessary.

What is claimed is:

1. A coffee puff snack comprising roast comminuted coffee bean granules and other grains,
    said coffee bean granules and other grains having been mixed together and puffed,
    said snack containing from 12.5% to below 60% of said coffee bean granules.
2. A coffee puff snack according to claim 1, wherein desired flavors are added around said puffed product.
3. A method of manufacturing a coffee puff snack, comprising the steps of feeding a mixed material of roasted comminuted coffee bean granules, other grains, and added moisture if necessary into an extruder;
    pressurizing and heating the mixed material to cause gelatinization of the mixed material and
    thereafter puffing, shaping and drying the mixed material to obtain a snack product containing from 12.5% to below 60% of said coffee bean granules.
4. A method of manufacturing a coffee puff snack according to claim 3, wherein the moisture is modulated to be of the order of 15% of all ingredients.
5. A method of manufacturing a coffee puff snack according to claim 3, wherein the roughness size of said coffee bean granules is 20 to 30 mesh, and the size of other grains is 12 to 20 mesh.
6. A method of manufacturing a coffee puff snack according to claim 3, wherein the roughness size of said coffee bean granules is 20 to 30 mesh, and the size of other grains is 12 to 20 mesh.
7. A method of manufacturing a coffee puff snack according to claim 4, wherein the roughness size of said coffee bean granules is 20 to 30 mesh, and the size of other grains is 12 to 20 mesh.
8. A coffee puff snack according to claim 1, wherein said snack contains below 50% of said coffee bean granules.
9. A coffee puff snack according to claim 8, containing below about 37.5% of said coffee bean granules.
10. A method of manufacturing a coffee puff snack according to claim 3, comprising the step of modulating moisture content in the mixed material to 10 to 20% of all ingredients.
11. A method of manufacturing a coffee puff snack according to claim 10, wherein the moisture content of the raw material is modulated to about 15% of all ingredients.
12. A coffee puff snack according to claim 1, wherein moisture content is 10 to 20% of all ingredients.
13. A coffee puff snack according to claim 12, wherein the moisture content is about 15% of all ingredients.
14. A coffee puff snack according to claim 1, wherein roughness size of said coffee bean granules is 20 to 30 mesh, and the size of other grains is 12–20 mesh.
15. A coffee puff snack according to claim 1, wherein said other grains are selected from wheat, rice or corn grains.
16. A coffee puff snack according to claim 15, wherein said other grains are corn grains.
17. A coffee puff snack according to claim 2, wherein said desired flavors coated about said puff snack are selected from the group consisting of sugar, honey, candy, caramel, chocolate and milk flavors.

* * * * *